United States Patent [19]

Sparks

[11] 4,420,221
[45] Dec. 13, 1983

[54] PASSIVE ANIMATED, OR PATTERN CHANGING SIGN

[76] Inventor: Lawrence N. Sparks, P.O. Box 134, San Marcos, Calif. 92069

[21] Appl. No.: 359,919

[22] Filed: Mar. 19, 1982

[51] Int. Cl.³ .................... G02B 27/00; G03B 25/02; G09F 13/02; G09F 13/16
[52] U.S. Cl. ........................................ 350/167; 40/454; 40/559; 40/582
[58] Field of Search ............... 40/437, 453, 454, 615, 40/616, 427, 548, 559, 563, 581, 582; 350/104, 106, 167; 428/29

[56] References Cited

U.S. PATENT DOCUMENTS

| | | | |
|---|---|---|---|
| 1,475,430 | 12/1923 | Curwen | 40/454 |
| 4,034,555 | 7/1977 | Rosenthal | 350/167 |

*Primary Examiner*—Bruce Y. Arnold
*Assistant Examiner*—William Propp

[57] ABSTRACT

A lenticular device is disclosed having a lens array with one or more lenticular convex ridges joined by cusped or concave valleys forming lens elements on one of its surfaces. In addition, the lenticular array is uniformly separated from a message transmitting surface by an air space directly related to a field of view of no more than 30° determined by the converging light rays at the focal point. The carrier sheet or message is a plurality of messages resolved from a series of linear segments in the form of binary lineations placed in focus relative to the lens array. By establishing a proportional relationship between lens aperture and focal length, the rate of message change is predetermined for any prescribed viewing situation. Surface interference caused by reflection, chromatic diffraction, and other light loss is controlled by the relationship of optical design, and optical quality, coupled with other structural elements.

10 Claims, 14 Drawing Figures

PASSIVE ANIMATED, OR PATTERN CHANGING SIGN

BACKGROUND OF THE INVENTION

For centuries, efforts have been expended to create illusions of motion, disappearances and appearances without apparent explanation. Optics did a great deal to enhance this slight of hand phenomenon by being light to mask, or channel angles of vision at the will of a practitioner.

Technological advances in plastics, lithography and mass production finally brought this art form beyond individual stage performances to the hands of every individual. The mass circulation of lenticular novelty devices transformed the passive audience into active participants. From that time on, imaginations have been sparked to convert these hand held novelty devices to practical use.

Attempts have been made to animate portions of billboards, general advertising signs, traffic control signs, and reflectors by the same optical means. However, the angle of change required to activate motion or change was too great to be practical for attracting attention at substantial distances from the lenticular surface. U.S. Pat. No. 2,951,419 was issued for the animation of reflectors and reflective signs for roadside use. The message change rate proved too slow to correspond with small angular changes related to an impending warning sign some 300 or more feet relative to a viewer's subtending motion. The relationship between aperture and focal length produced light rays with included, or divergent angles must too large to affect message changes or motion at the sign face with it subtended an angle of less than twenty degrees. Also, the structural juxtaposition of the lenticular lens and the reflective carrier sheet reduced the reflected light below acceptable standards for highway or roadside use because of spherical aberrations caused by the individual lens ridges and the diffusing nature of the short focal length directly on the back side of the lens sheet. U.S. Pat. No. 3,590,509 applied the multiple message characteristics of lenticular optics to large, single message lens relief letters with varying focal lengths, backed by reflective patterns spaced from the back of the lens. This attempt was to give a sign facing an appearance of sparkling or random background motion. However, there was no regard for uniform or controlled focal lengths because the message was stamped into the sign face. Therefore the passive motion was happenstance at best and, at distances of fifty feet or more, only isolated and imperceptible movement prevailed.

U.S. Pat. No. 3,314,179 attempts to resolve the minimum angle changes which occur at great distances by motorizing the lenticular device for continuous motion. The specific linguistic description used in this patent describes the separation of the lenticular screen from the graphic display as a friction reducing function and a means to minimize physical damage to the lenticular ridges. This electrical approach has its greatest benefits when the observer is standing still. But when an observer is in motion, the effects can vary widely according to the speed of the device in relation to the observers motion. In areas where ordinances prohibit the use of outdoor signs with moving parts; flashing lights, or physical movement in general; or where electrical facilities are not available, this approach is not practical. Further, there is no reference, acknowledgement, or solution offered for surface light reflections and light interferences caused by the "friction reducing" space separating the lens sheets and message carrier when not backlighted. It is apparent from the preceding brief that prior art has not addressed the problem of supplying a lenticular sign or lenticular signaling device with predictable motion prescribed for specific viewing situations without an applied energy source. Further, the prior art does not provide for a lenticular device which does not substantially deminish the lighting characteristics of the source used to illuminate the lenticular screen.

SUMMARY OF THE INVENTION

Therefore, it is the object of this invention to provide a passive lenticular sign or lenticular signaling device capable of predictable movement at a distance and at message change rates where information for an observer becomes pertinent relative to the observer's position and motion. Another object of this invention is to provide for a passive lenticular sign with predictable movement of multiple messages which conserves energy and affects an apparent improvement in light return and/or illumination.

Typically, those familiar with the lenticular art forms know that lenticular screens essentially consist of a plurality of adjacent parallel, truncated cylindrical transparent lenses placed over a carrier sheet containing a plurality of graphically imposed images in binary form aligned relative to the lens elements. Further, it is well known in the industry that these linear lenses focus on the underlying image strips masking parts of the underlying image strips and exposing others, depending on the viewing angle. The current state of the art subscribes to a lenticular lens array laminated to, or placed in direct juxtaposition with, an underlying message carrier sheet. This thin, laminated methodology works extremely well for non-reflectorized, hand-held novelty devices and other closely viewed articles. In applying this technique to reflective or lighted signs designed for viewing at large distances two major shortcomings become apparent: (1) actual light loss due to lens design or diffusion, and (2) the rate of change between multiple messages or movement being too slow to be meaningful in fast pace situations such as high speed motorized or quick change pedestrian applications where the angular displacement of a subtending observer is less than 15°.

Where the state of the art subscribes to laminating or directly juxtapositioning a reflective carrier sheet to a lenticular lens array, the fundamental purpose of reflective sheeting i.e. to return a substantial portion of light in the direction from which it came, is reduced to the simple law of reflection. When the curved portion of the lenticules are facing towards the light source, the lens curvature tends to scatter the incoming light causing surface glare and light interference caused by spherical aberrations. The transparent lenticular lens array itself absorbs incoming light rays and the rays returned by a reflective background are again absorbed. Absorption occurs: at the surface of reflective materials; in the inks used in the printed message; and, additionally, with light refraction when an adhesive is used to bond a reflective material or message to the lenticular surface. Although light loss cannot be eliminated due to absorbtion, refraction, and reflection, the effects can be minimized through proper fabrication and selection of the form of materials employed.

By turning the lenticular lens array inside the sign, facing the message or carrier sheet, and by spacing the lens array apart from the carrier sheet, the spherical aberration or surface glare of the curved lens elements is substantially minimized. In fact, at certain angles, there is an apparent increase in the light return of the reflective material employed when viewed through an optically clear lens array which transmit at least 85% of the light striking its surface and when the lenticular lenses are separated from the message sheet. However, at other angles relative to the observer and light source, the lens surface cusps take on the physical properties of a diffraction grating casting shadows on the message sheet. This phenomena occurs when the frontal light source exceeds the surrounding ambient light, most particularly at night, and becomes more pronounced as the number of lens elements per square inch increases. When the observer is at viewing angles where he sees the overlapping of the shadows, the light return potential of a reflective material is reduced substantially. This light loss due to cusp shadows is only apparent when the lens array and message sheet are separated and positioned at or near the focal point. To eliminate the shadow effect caused by the cusp lines, each cusp is replaced with a concave lens which collects the available surface light in these areas, spreads the light rays over the message surface, and transmits the intended data within its focal plane rather than cusp line interference patterns. When the sign is backlighted, the cusp line shadow is not apparent. The diffraction interference can only be reflected and can not be projected. The magnifying and light gathering capacity of an optically clear lenticular lens array with an 85% or better transmitting capacity affects an apparent increase in the luminance at the focal point, making it feasable to produce the effect of a high intensity sign with a low wattage lighting system at the focal plane.

A second limiting characteristic of the prior art is the image change rate. When the image or message is placed directly behind and against the lenticular array, the focal point is substantially near the back surface of the lenticules. With the focal plane so close to the surface of the front viewing screen, the light rays are refracted at very large included angles to an apex or focal point on the back side. This large included angle relates to the distance required to affect a change from one image to another. The closer the focal point is to any given lens, the greater the angle of motion is required to affect change, providing the aperture remains constant. The message change rate as it relates to an observers motion is proportional to a ratio between aperture and space and is determined by the relationship of focal length and half the aperture width. For the purpose of developing an efficient passive signaling device for long distance effectiveness, where message change rates should occur for subtending motion less than 15°, the prism shape of the converging light rays should be at an included angle no greater than 30° at the focal point. This angle is proportional to the relationship of the lens aperture to lens focal length or the expression a/f. Consequently, it is not enough to simply separate a message from a lens array to accomodate a focal length without first considering the message change rate in relation to the angle formed by the converging light rays at the focal point relative to half the aperture width and focal length. The lens radius must be substantially large in relation to the aperture to cause the included angle to not exceed 30° at the focal point. The spacial relationship between message and lens facing should be restricted to as small a distance as is practicable for the application because frame depth tends to obscure the image by a ratio relative to the observer's angular position as measured from a line perpendicular to the sign face and the depth of the sign; and the closer the lens array is to the carrier sheet the greater the savings from light loss will be realized. The space behind the lens array allows the lenticules to be turned in towards the message to further reduce the spherical aberrations of the convex lenticules themselves.

Since the speed of a passive lenticular device is predetermined by establishing the included angle of the focal point relative to aperture width and focal length of the individual lenticules, the comprehension level of an observer must be related to the various applications. The rate of change can not exceed 24 flashes per second for human observation and comprehension. Message change rates near 24 flashes per second cause flicker fusion and result in multiple images becoming undecipherable to the human eye, or in one message being selected over another at these high flicker rates. However, the rate of change can be greater than 24 flashes per second when observation or scanning is accomplished by electronic, mechanical, electrochemical, or other means; in which case, the change rate is limited only by the limitations of the equipment used for scanning. Where passive coded communications is of paramount importance, the size/order relationship between concave, convex lens elements can be arranged to affect bar codes wherein one bar code set remains constant while another code set can be transmitted independently or in phase with each other. Code is used herein to mean symbols with minimum access definitions or trade symbols.

Another consideration posed by the lenticular lens characteristics being related to the focal length is the total viewing angle of a lenticular sign. A lenticular array can convey a message up to about 42° on either side of a line perpendicular to the sign face, or a total observable angle beyond 84° a lens results in one being unable to focus on the image film and tends to distort the image. Distortion is used here to mean a change from the original intended graphic or message design.

This invention is bounded by the limitations of lenticular mechanics as it pertains to optical characteristics employed to transmit information. Further boundries of this invention deal specifically with limitations of human eye resolution of alternating images and with the time rate of change of such images. It is in the nature of the invention that the message time rate of change may be predicted for conditions dealing with specific applications, at predetermined distances, in relation to any predisposed viewing and lighting situation. The invention will be better understood, and functions other than those specifically set forth above, will become apparent when consideration is given to the following detailed description and drawings.

In the drawings:

FIGS. 11, 12, 13 and 14 are schematic illustrations of various approach paths to FIG. 1.

DESCRIPTION OF THE PREFERRED EMBODIMENTS

Figures 1, 2:
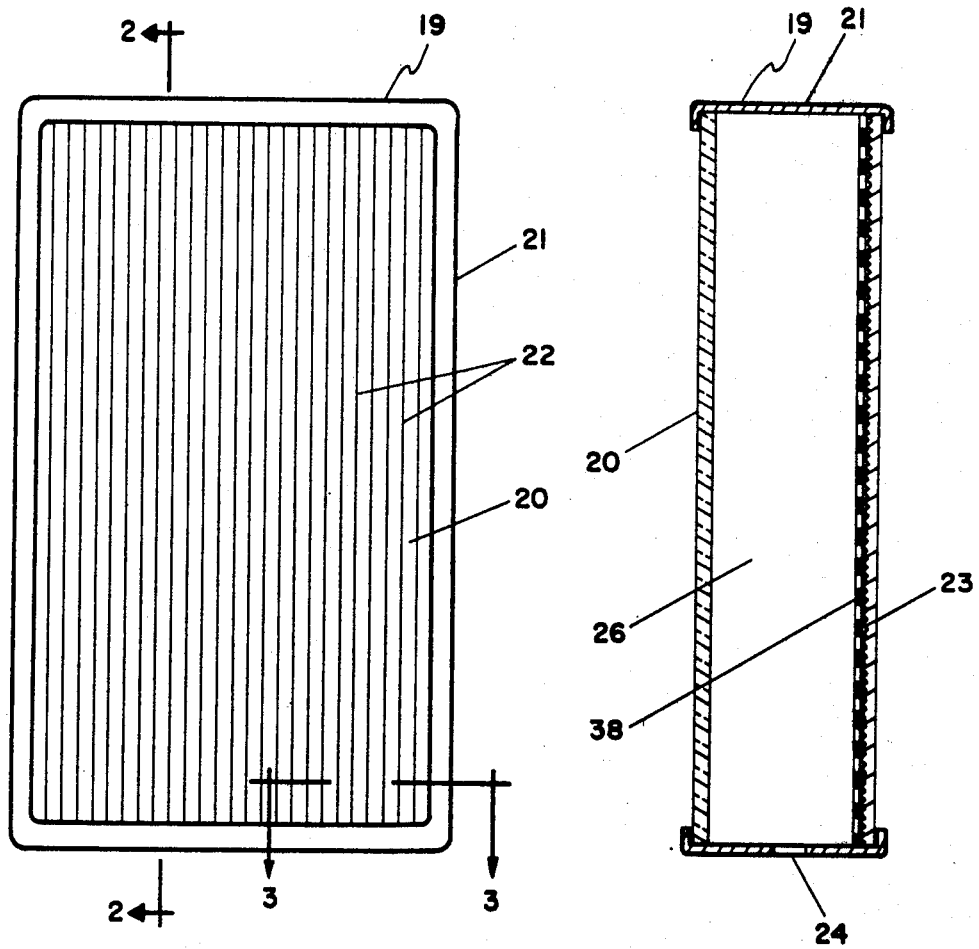
FIG. 1 is a frontal view of a typical lenticular apparatus.
FIG. 2 is a sectional view taken on lines 2—2 of FIG. 1.

The basic form of the lenticular sign 19 in FIG. 1, is a rectangular configuration held together by a simple channel holding frame 21. However, the sign is adaptable to a wide variety of shapes and supporting structures to suit the particular use.

Lens array 20 is constructed of an optically clear material capable of transmitting at least 85% of the light striking its surface. Government regulations set forth intensity standards for the various reflective materials used in traffic information and control. If a lower quality lens array 20 is used, the light return of the reflective material 23 is reduced below the manufacturer's rated reflective standards. Light loss is due to spherical aberrations and light absorbtion of lens array 20, reflective carrier sheet 23, and the color used in the message imprint 38, FIG. 10. FIG. 2 is a sectional view of lines 2—2 of FIG. 1 showing lens array 20 at a constant space 26 from message 38 supported by a reflectorized carrier sheet 23. Other carrier sheets 23 can be substituted if sign 19 is for purposes other than a reflective sign. Space 26 is constant relative to the focal length 26 of lens elements 22 on lens array 20.

Figure 3:
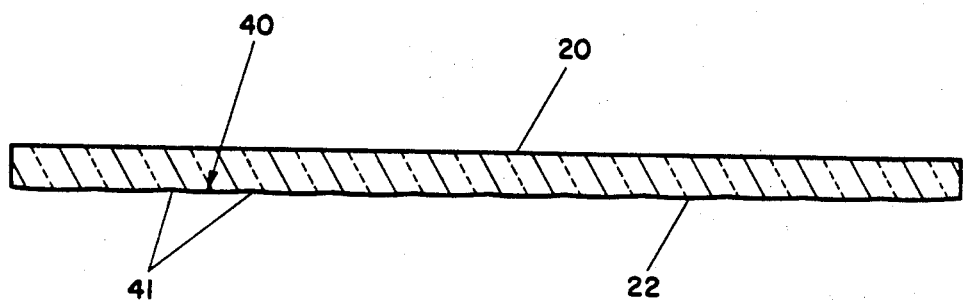
FIG. 3 is an enlarged schematic illustration of lines 3—3 in FIG. 1.

Lens array 20, detailed in FIG. 3, is composed of parallel lenticular lens elements 22 substantially cylindrical in shape and truncated by a chord equal to the desired aperture 41. The physical properties of each lens element 22 is restricted to the desired function of sign 19. The parameters outlined herein are considered the best mode for a passive image changing system suited for transmitting multiple images to an observer's angular displacement 50 which subtends 15° or less relative to the sign face 20, illustrated in FIGS. 11 through 14. Two critical considerations are (1) light loss, and (2) image change rate 51 resulting primarily from the physical properties of lens 22, lens array 20, message imprint 38, and focal length 26, FIG. 4. To reduce the spherical aberrations, surface glare and reflections, the convex portion of lens element 22 is oriented towards image film 38. The large relative radius 40 of lens element 22, FIG. 3, allows more surface area for light return from the reflective image film 23 to the observer. The ratio between lens radius 40 and aperture 41 (a/r) should remain as close as possible for any given application to maximize light return. The incoming light values striking lens element 22 are reduced through refraction to a minute area at the surface of message carrier sheet 23. This, in effect, is concentrating whatever light value was measured at the lenticular surface 20 to a fine line at the focal point 39. The same amount of light, or substantial portion thereof, entering lens surface 22 is now occupying a considerably smaller surface are at focal point 39.

Reflective materials are designed to return a good portion of the light striking the surface. With this light concentration affected by lens element 22, the reflected light return will be of considerably greater brightness per unit area than the light which originally entered lens 22 per unit area. By using an optically clear lens array 20 which transmits 85% or more of the light stiking its surface and by maintaining a substantially flat lens 22, FIG. 3, the apparent reflectivity of the reflective carrier 23 is increased over its reading when tested outside the lenticular sign structure 20 under the same lighting conditions. Conversely, when message carrier 38 is lighted from the back side, the light rays are magnified and the apparent luminance is brighter per unit area at the focal point 39 than when viewed from behind lenticular array 20. Consequently, it is possible to use a lower wattage lighting system to affect a high intensity sign face 20. Because of the basic nature of lens element 22 concentrating light into narrow bands, the heat build up can be substantial. Therefore, venting and drain holes 24, FIG. 2 can be provided in various structural locations to reduce the possibility of heat or moisture damage. Additionally, because of the large variation in temperature within the sign from day to night, seasonally, and geographically, it is important the various sign components 20, 21, and 23 are constructed of materials having compatable thermal coefficients for expansion and contraction to maintain continuous alignment of the individual binary elements 38, FIG. 10, and lens elements 22.

Figure 10:
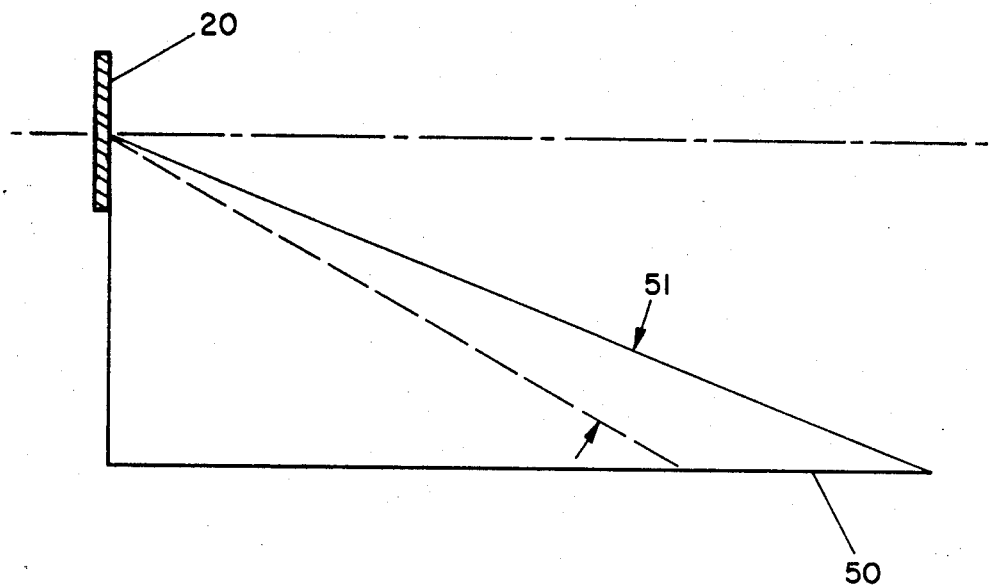
FIG. 10 is a schematic illustration of one kind of binary message system.
Figure 11:
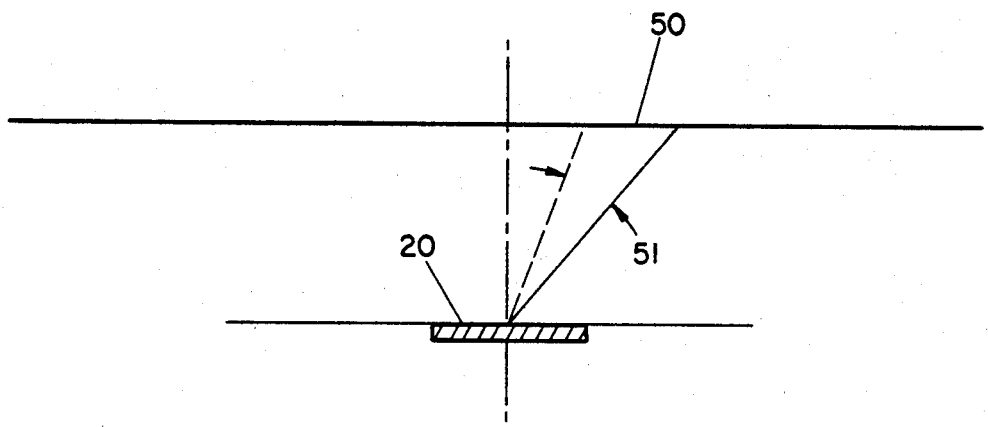
Figure 12:
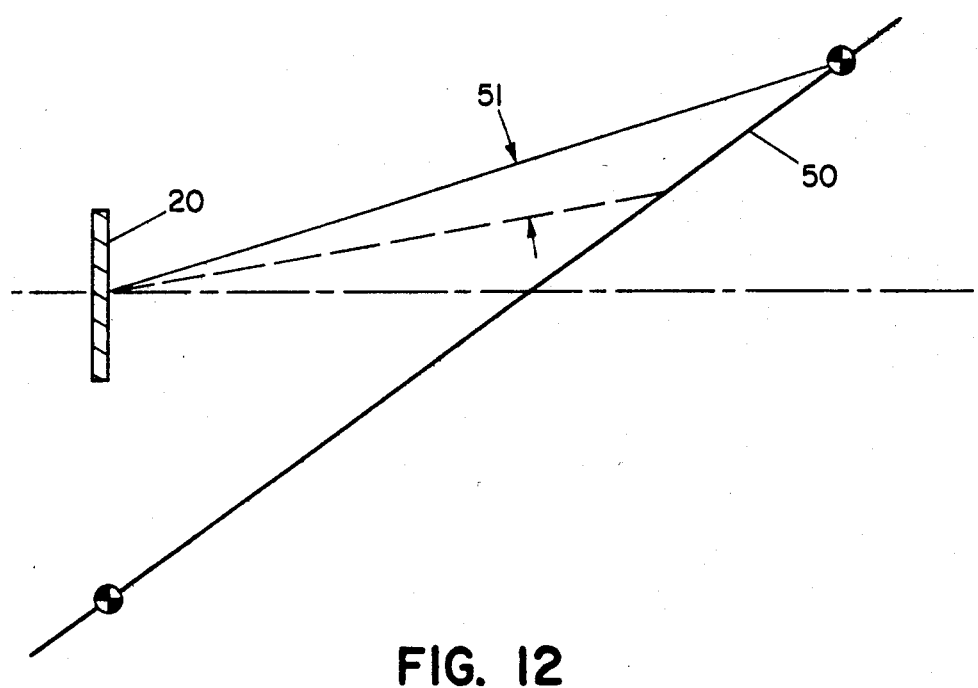
Figure 13:
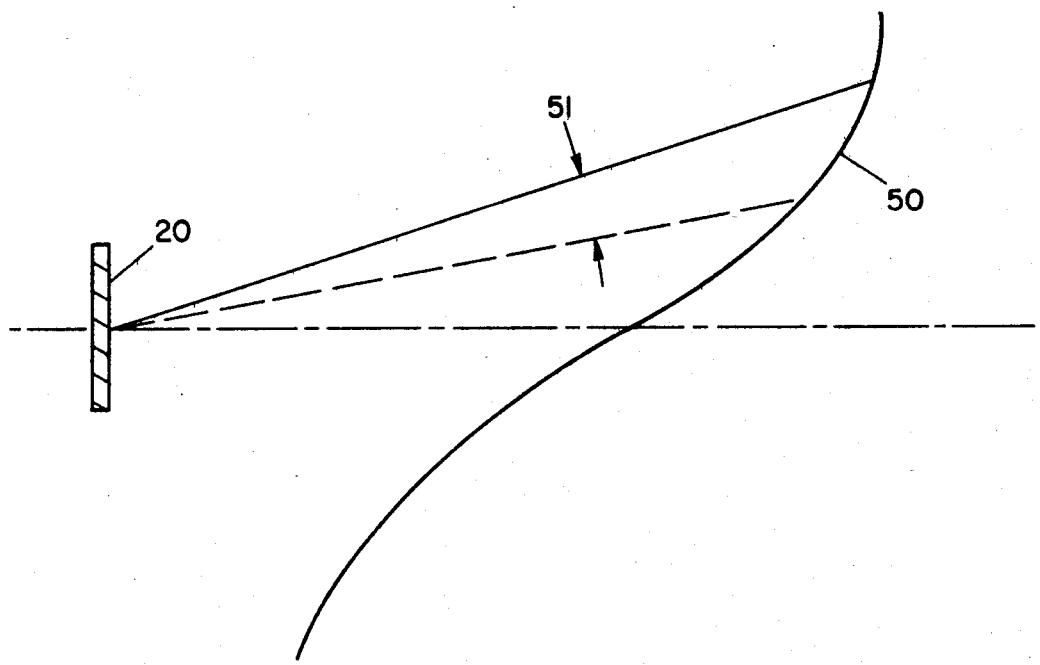

The message or pattern design 38, behind lens array 20 is a series of binary lines 38, FIG. 10, aligned relative to lens 22. The parallel strips 38 are of varying colors applied photographically or mechanically to produce effects ranging from animation; on-off flashing; special effects; three dimensional illusions, to bar codes. Various distortions are also achieved by off-setting patterns 38 from lens elements 22 either in pattern density or inclinations other than the typical parallel mode with lens 22. Basic lens element 22 magnifies or regroups the binary lineations 38 into perceptible message or image transmissions and determines the change rate from message to message relative to aperture size 41 and focal length 26, FIG. 4, as it relates to an observer's displacement 50, FIGS. 11 through 14, relative to sign face 20.

Figure 5:
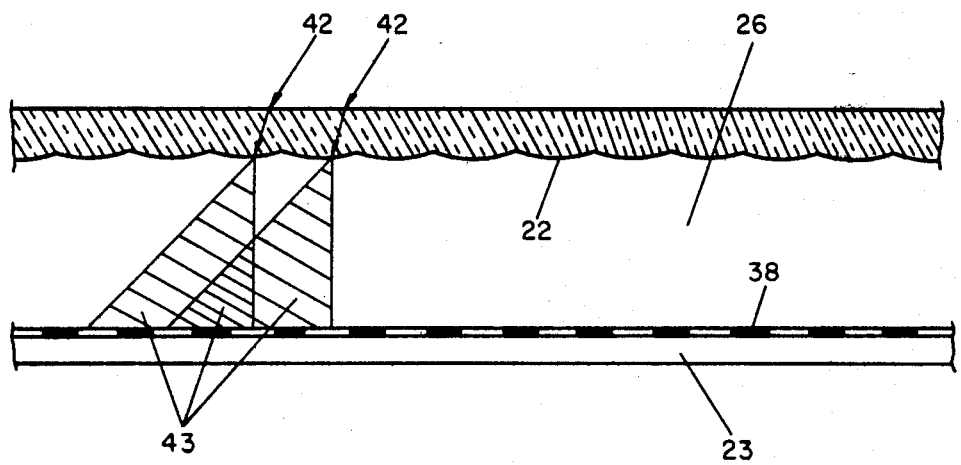
FIG. 5 is an enlarged schematic illustration of cusp line shadow interference.
Figure 6:
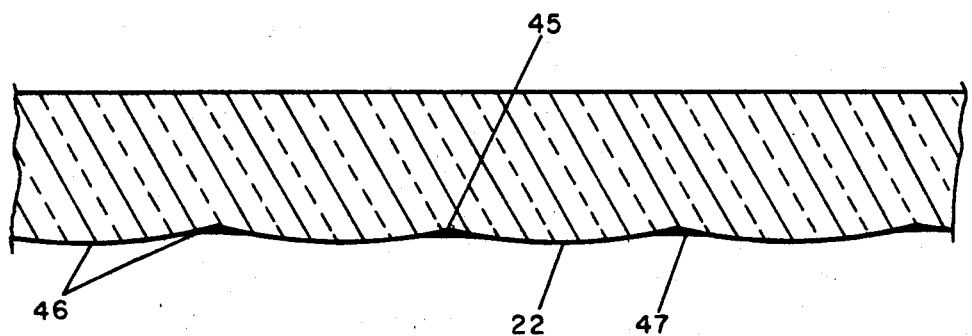
FIG. 6 is an enlarged sectional illustration of one type of lenticular lens array from lines 3—3 in FIG. 1 with joining concave lenses.
Figure 7:
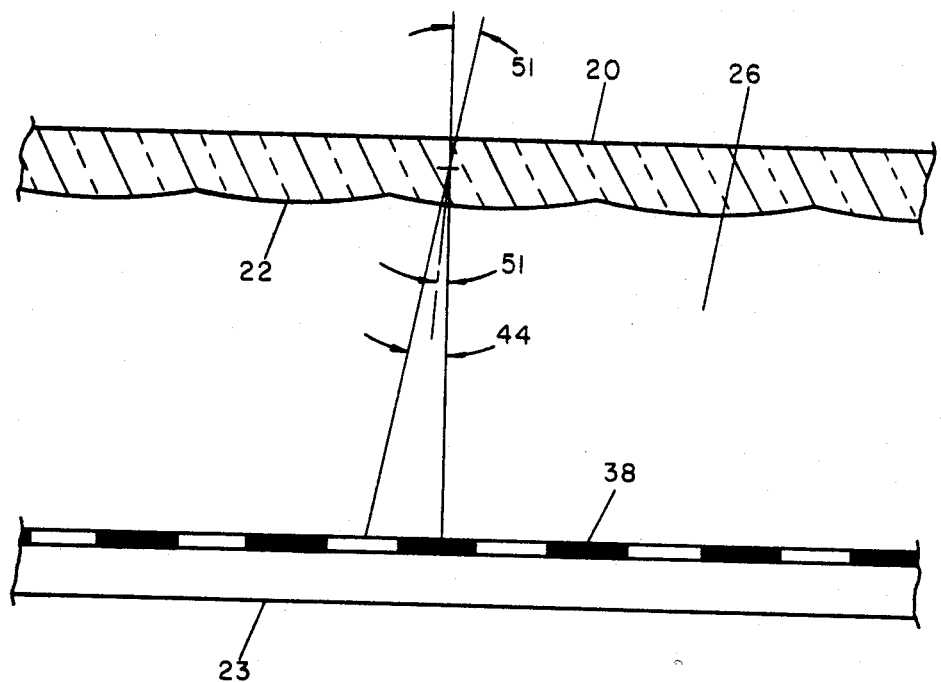

Another light reducing characteristic of lenticular array 20, only apparent when spaced 26 from the message carrier sheet 23, and when the light emitted from sign face 20 is associated with incoming light and relfected back by reflective carrier 23, is lens surface cusp 42, FIG. 5. Between each lens element 22 there is a lens surface cusp 42 which, as a conjugative whole, becomes a diffraction grating, casting shadows 43 on the opposite surface 23 from the light source. Since the nature of convex lens 22 is to refract light towards the center and magnify the image at the focal point 39, the light interference patterns 43 of lens cusp 42 is also bent towards the focal plane 39 and returned magnified or enhanced to the observer thus reducing the light intensity of the reflective carrier sheet 23 proportional to the physical properties of the surface cusp 42. However, as the observer moves off center from the light source, the reflected diffraction pattern is masked from view by the angle equal to the ordinary law of reflection. To eliminate the diffraction patterns 43 when viewed in angles affected by the cusp shadows 43, concave lens 45, FIG. 6, is used in place of cusp line 42. Concave lens 45 gathers the available light in these areas spreading the collected light rays over message carrier 23. With the inclusion of concave lens 45, the intensity of reflective carrier sheet 38 is realized through a full viewing angle 25 of sign face 20. It is important that aperture 41 and radius 47, of concave lens 45 is formed as to prevent surface distortion or interference with the intended effects or change rate of the designated message system. When message 38 is projected through sign face 20 by an illuminating system not associated with reflected lighting, concave lens 45 is not required because cusp shadows 43 can only be reflected and not projected. The practitioner can quickly grasp other significant interrelationships of concave lens 45 and convex lens 22 FIG. 6. By inverting the order of concave lens 45 and convex lens 22, or other seemingly erratic relationships, two bar codes 38 can be transmitted simultaneously or in phase with each other. By this method, code 38 combinations are innumerable.

Another light reducing characteristic of space 26 as it relates to reflectorized carrier 23; sign housing 21 tends to shade or cast frame 21 shadows on message 38 during dayling hours giving front lens array 20 a mirror effect. If this characteristic is unsuitable for the application, at least one side 21, and/or message carrier 23 must be translucent utilizing ambient light for eliminating surface glare, diffraction gratings or other interference patterns which may be present across lens array 20.

Figure 4:
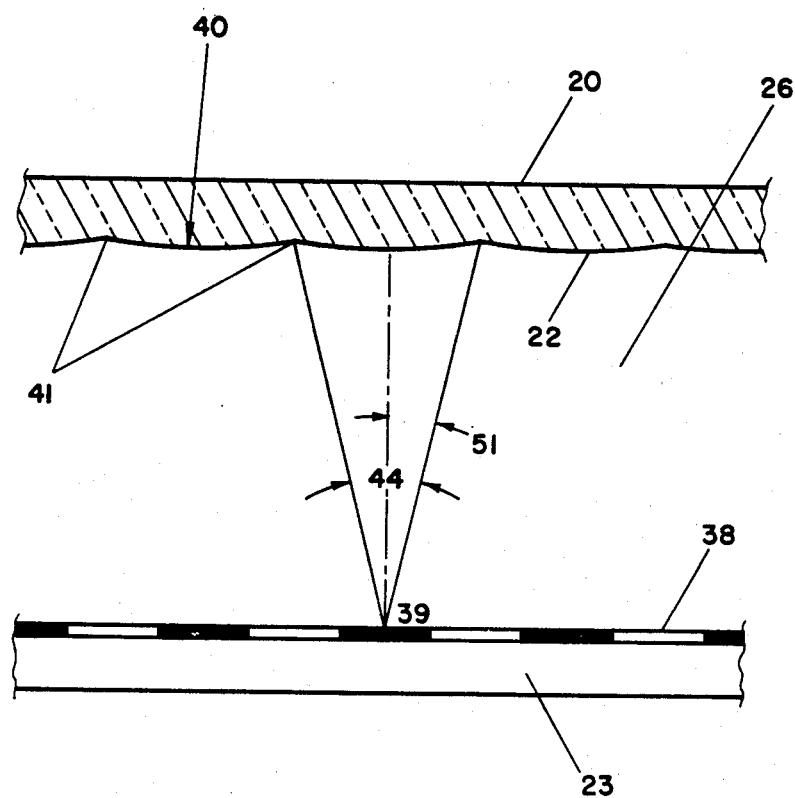
FIG. 4 is an enlarged schematic illustration of the included angle of a typical convex lens from lines 3—3 of FIG. 1.
Figure 8:
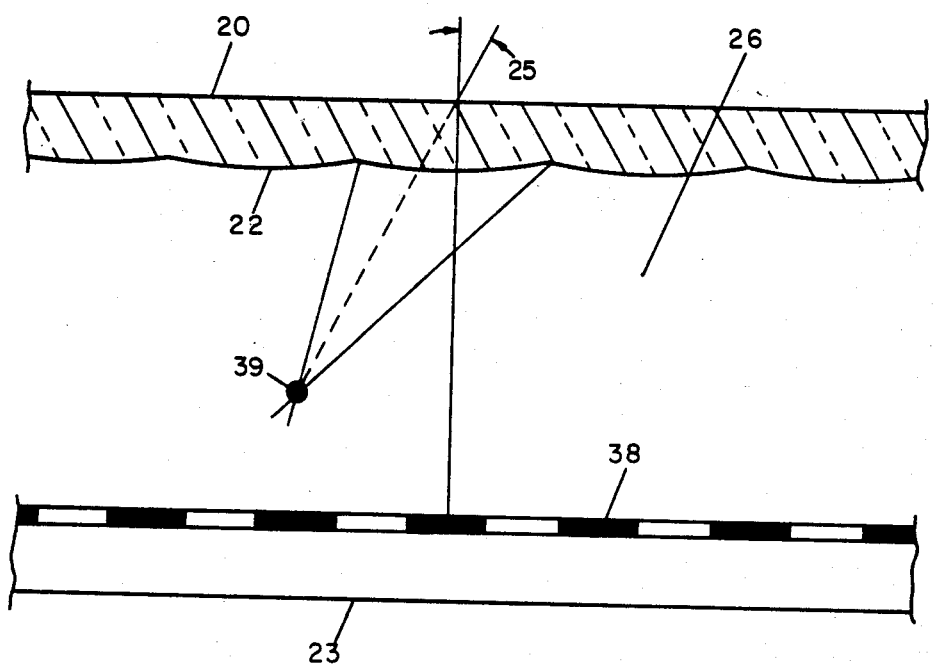
FIG. 8 is an enlarged schematic illustration of a typical lens element in lines 2—2 in FIG. 1 showing the angular relationship of observer to lens face and lens to message carrier.

Image change rate 51 is affected by the size of the included angle 44, FIG. 4, of lens elements 22 and 45. The wider the angle 44, the greater the observers travel distance required to affect change. For the purpose of long distance viewing where message change rates are suited for angle changes no greater than 15°, the included angle 44 will not exceed 30°. However, to determine the specific image change rate 51, FIG. 8, the observers angular displacement rate 50, FIGS. 11 through 14, across sign face 20 is proportional to a ratio between aperture 41, and space 26 and is determined by the relationship of focal length 26 and half the aperture width 51, FIG. 8. As an illustrative model, when the light divergent, or included angle 44 of lens elements 22 and 45 are pre-set at 30°, the image change rate 51, will occur every 15° as an observer subtends lens elements 22 and 45 at 15° intervals illustrated in FIGS. 8, 11 through 14.

Figure 9:
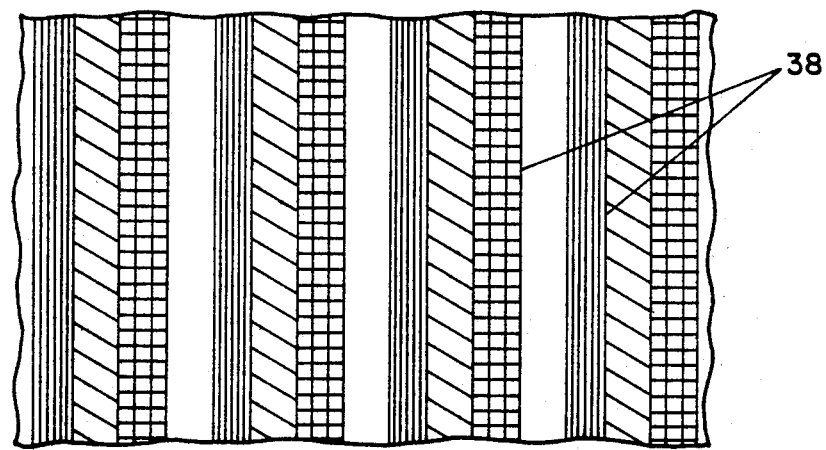
FIG. 9 is an enlarged schematic illustration of focal point displacement beyond 42° from a line perpendicular to the sign face.

Another characteristic of lens elements 22 and 45 related to the focal point 39, is the total viewing angle 25 of lenticular array 20. Lenticular array 20 can convey a message 38 up to about 42° on either side of a line perpendicular to sign face 20, or a total viewing angle 25 of 84°. Beyond viewing angle 25, lens elements 22 and 45 are unable to focus on image film 38 and tends to distort image 38, FIG. 9.

FIGS. 11, 12, 13 and 14 are various observer approach angles to FIG. 1 which relates to maximizing the full viewing angle 25 of sign face 20 relative to an observer's path of travel 50, corresponding with the preferred message change rate 51.

Having now described the preferred embodiments of the invention and having explained the function thereof, I claim:

1. A lenticular lens array comprising a sheet of transparent material having at least one side composed of a plurality of parallel, elongated, lenticular, and convex lens elements with concave lens elements at each cusp formed by adjacent convex lens elements.

2. The lenticular lens array of claim 1 wherein the included angle of converging light rays through said convex lens elements does not exceed 30° at a focal plane spaced beyond said convex lens elements.

3. A passive, lenticular optical device comprising:
   a sheet of transparent material having at least one side composed of a plurality of parallel, elongated, lenticular, and convex lens elements,
   a message carrier spaced apart from said sheet of transparent material by a distance substantially equal to the focal length of said convex lens elements such that the included angle of converging light rays at the focal point of each convex lens element does not exceed 30°,
   the surface of said message carrier facing said sheet of transparent material having a plurality of markings patterned graphically or mechanically into a series of segments in the form of binary patterns spaced relative to said convex lens elements for viewing through said sheet of transparent material, and the message change rate of said message carrier is predetermined by said included angle which is proportional to the relationship of the lens aperture to lens focal length.

4. A passive, lenticular optical device comprising:
   a sheet of transparent material having at least one side composed of a plurality of parallel, elongated, lenticular, and convex lens elements with concave lens elements at each cusp formed by adjacent convex lens elements,
   a reflectorized message carrier spaced apart from said sheet of transparent material by a distance substantially equal to the focal length of said convex lens elements such that the included angle of converging light rays at the focal point of each convex lens element does not exceed 30°,
   and the surface of said reflectorized message carrier facing said sheet of transparent material having a plurality of markings patterned graphically or mechanically into a series of segments in the form of binary patterns spaced relative to said convex lens elements for viewing through said sheet of transparent material.

5. The lenticular device of claim 4 wherein said sheet of transparent material transmits at least 85% of the light striking its surface.

6. The lenticular device of claim 4 wherein housing elements hold said sheet of transparent material at a distance substantially equal to the focal length of said convex lens elements away from said reflectorized message carrier and are translucent to reduce lens surface glare and reflections off said carrier surface caused by housing shadows and diffraction gratings.

7. A passive, lenticular optical device comprising:
   a sheet of transparent material composed of a plurality of parallel, elongated, lenticular, and plano-convex lens elements with concave lens elements at each cusp formed by adjacent plano-convex lens elements,
   a reflectorized message carrier spaced apart from said sheet of transparent material by a distance substantially equal to the focal length of said plano-convex lens elements such that the included angle of converging light rays at the focal point of each plano-convex lens element does not exceed 30°, and the surface of said reflectorized message carrier facing said sheet of transparent material having a plurality of markings pattered graphically or mechanically into a series of segments in the form of binary patterns spaced relative to said plano-convex lens elements for viewing through said sheet of transparent material.

8. The lenticular device of claim 7 wherein said sheet of transparent material transmits at least 85% of the light striking its surface.

9. A passive, lenticular optical device comprising:
a sheet of transparent material having at least one side composed of a plurality of parallel, elongated, lenticular, and convex lens elements,
a back lighted message carrier spaced apart from said sheet of transparent material by a distance substantially equal to the focal length of said convex lens elements such that the included angle of converging light rays at the focal point of each convex lens element does not exceed 30°,
and the surface of said back lighted message carrier facing said sheet of transparent material having a plurality of markings patterned graphically or mechanically into a series of segments in the form of binary patterns spaced relative to said convex lens elements for viewing through said sheet of transparent material.

10. The lenticular device of claim 9 wherein said convex lens elements have concave lens elements at each cusp formed by adjacent convex lens elements.

* * * * *

UNITED STATES PATENT AND TRADEMARK OFFICE
CERTIFICATE OF CORRECTION

PATENT NO. : 4,420,221
DATED : December 13, 1983
INVENTOR(S) : Lawrence N. Sparks It is certified that error appears in the above-identified patent and that said Letters Patent is hereby corrected as shown below:

The title page should be deleted to appear as per attached sheet.

Column 1

Line 9 change "slight" to - sleight -

Column 5

Lines 51 & 52 change "11 through 14" to - 10 through 13.

Column 6

Line 32 change "10," to - 9, -
    Line 35 change "10," to - 9, -
    Line 48 change "11 through 14" to - 10 through 13, -

United States Patent [19]

Sparks

[11] 4,420,221
[45] Dec. 13, 1983

[54] PASSIVE ANIMATED, OR PATTERN CHANGING SIGN

[76] Inventor: Lawrence N. Sparks, P.O. Box 134, San Marcos, Calif. 92069

[21] Appl. No.: 359,919

[22] Filed: Mar. 19, 1982

[51] Int. Cl.³ .................. G02B 27/00; G03B 25/02; G09F 13/02; G09F 13/16
[52] U.S. Cl. .................. 350/167; 40/454; 40/559; 40/582
[58] Field of Search ............. 40/437, 453, 454, 615, 40/616, 427, 548, 559, 563, 581, 582; 350/104, 106, 167; 428/29

[56] References Cited

U.S. PATENT DOCUMENTS 1,475,430 12/1923 Curwen .................. 40/454
4,034,555 7/1977 Rosenthal .................. 350/167

*Primary Examiner*—Bruce Y. Arnold
*Assistant Examiner*—William Propp

[57] ABSTRACT

A lenticular device is disclosed having a lens array with one or more lenticular convex ridges joined by cusped or concave valleys forming lens elements on one of its surfaces. In addition, the lenticular array is uniformly separated from a message transmitting surface by an air space directly related to a field of view of no more than 30° determined by the converging light rays at the focal point. The carrier sheet or message is a plurality of messages resolved from a series of linear segments in the form of binary lineations placed in focus relative to the lens array. By establishing a proportional relationship between lens aperture and focal length, the rate of message change is predetermined for any prescribed viewing situation. Surface interference caused by reflection, chromatic diffraction, and other light loss is controlled by the relationship of optical design, and optical quality, coupled with other structural elements.

10 Claims, 14 Drawing Figures

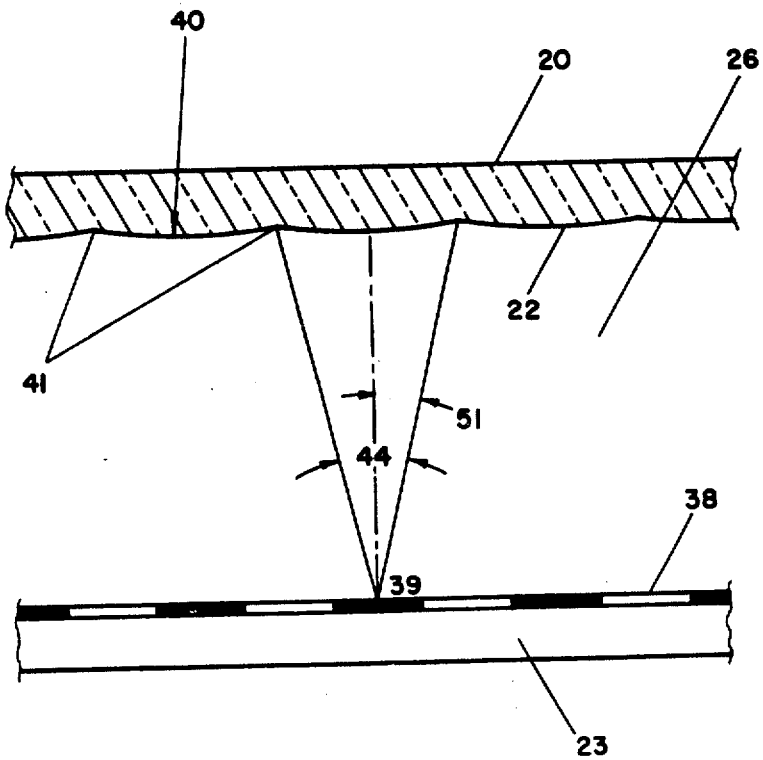

UNITED STATES PATENT AND TRADEMARK OFFICE
CERTIFICATE OF CORRECTION

PATENT NO. : 4,420,221

DATED : December 13, 1983

INVENTOR(S) : Lawrence N. Sparks

It is certified that error appears in the above-identified patent and that said Letters Patent is hereby corrected as shown below:

Column 7

Line 39 change "8," to - 7, -
    Line 40 & 41 change "11 through 14," to - 10 through 13, -
    Line 44 change "8." to - 7. -
    Lines 48 and 49 change "8, 11 through 14." to - 7, 10 through 13. -
    Line 57 change "9." to - 8. -
    Line 58 change "11, 12, 13, and 14" to - 10, 11, 12 and 13 -

Signed and Sealed this

Seventeenth Day of April 1984

[SEAL]

Attest:

GERALD J. MOSSINGHOFF

Attesting Officer      Commissioner of Patents and Trademarks